April 9, 1929.  F. R. HOUSE  1,708,541
DISTANT CONTROL MECHANISM
Filed April 2, 1927
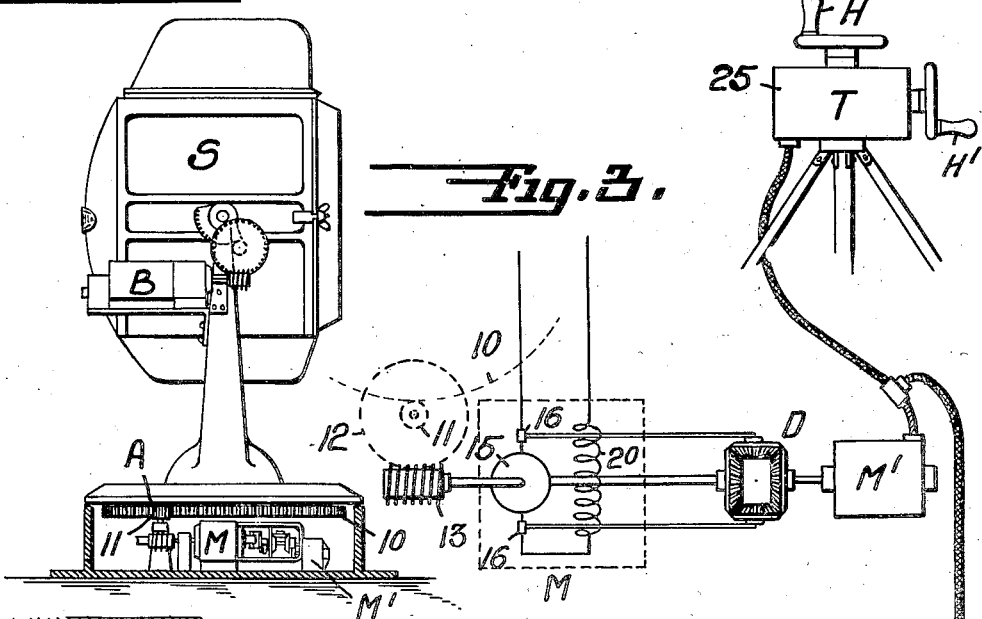
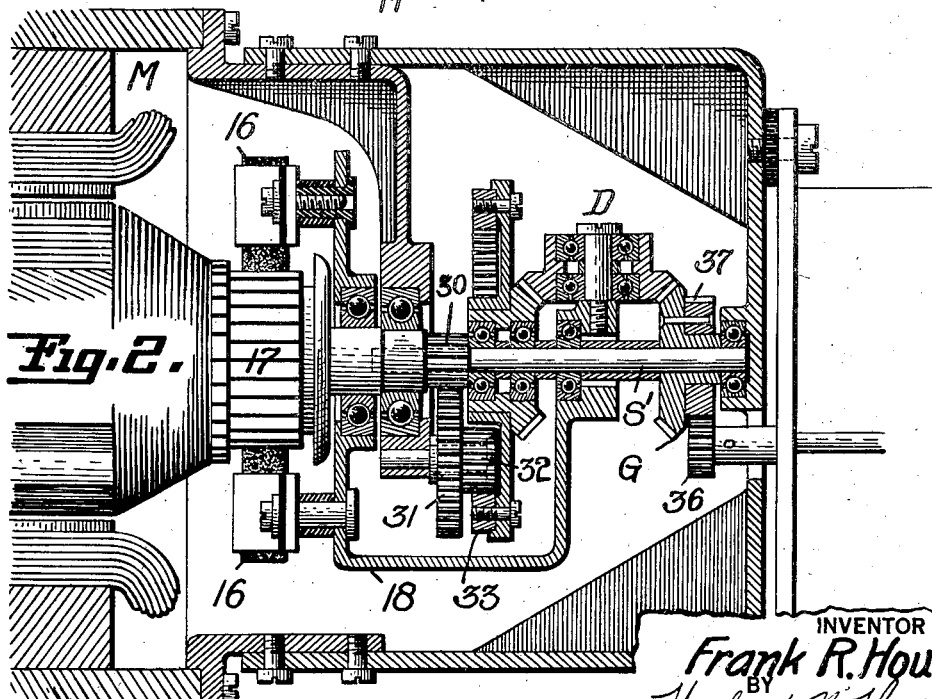
INVENTOR
Frank R. House.
BY
Herbert R. Thompson
his ATTORNEY Patented Apr. 9, 1929.

1,708,541

UNITED STATES PATENT OFFICE.

FRANK R. HOUSE, OF BALDWIN HARBOR, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK.

DISTANT CONTROL MECHANISM.

Application filed April 2, 1927. Serial No. 180,467.

This invention relates to the distant control of the movements of objects, especially heavy objects such as searchlights, guns and similar apparatus and devices. It is one of the objects of my invention to provide a distant control means which shall be capable of actuating the object to be moved from a distance so that said object shall respond immediately to any desired amount and rate of movement and which shall be capable of operating through very small angular distances in spite of the size or weight of the object.

It is a further object of this invention to provide what I may term an automatic torque regulator, that is to say, a device wherein the necessary torque for moving a load or object is automatically varied in accordance with the load. Heretofore, motors for moving objects, such as searchlights and guns, have been employed, each operating on the potentiometer system or some similar system for impressing a given torque upon said motor and said torque remained constant so that at the beginning of moving the object the speed of said object picked up very slowly, but once the static inertia was overcome the motor raced ahead unless the voltage across the fields was varied. In my invention I provide means whereby the torque generated by the motor, automatically accommodates itself to the load to be overcome so that when moving an object from rest, at which time the load is greatest, the greatest torque is generated by the motor, and without further resetting of any controller mechanism the torque of the motor diminishes as the speed of the driven object picks up, in other words, diminishes as the necessity for the torque diminishes.

It is a further object of my invention to provide a distant control mechanism wherein synchronism may be obtained at all times, for all speeds between zero and the maximum design speed, between the speed of the controlling element and the speed of the object to be moved. This synchronism prevails in spite of the automatic torque variation described in the preceding paragraph.

A further object of my invention is the provision of a motor capable of automatically varying its torque output in accordance with the load requirements, as hereinbefore described, and which can be reversed without requiring complicated mechanism in its structure for effecting such reversal.

A further object is the provision of a motor for moving an object, as hereinbefore set forth, which is capable of acting as a dynamic brake to bring the object to rest as soon as the controller is brought to stop position.

It is a further object of my invention to eliminate the large number of contacts usually employed in these distant control systems and in this manner eliminate one of the largest factors tending to cause damage to the device and necessitating replacement of parts, that is, the making and breaking of contacts. I avoid this by causing my controller or control transmitter to operate a light duty synchronous motor so that only a very light current need be employed between the transmitter and the motor, hence, sparking at contacts is avoided. The said light-duty motor may act in the form of a relay motor to assist in the control of the heavy duty servo motor which drives the object.

A further object of this invention is the provision of a light-duty relay motor and a heavy-duty servo-motor, so arranged that the action of the servo-motor assists the relay motor so that the latter is capable of higher speeds and of carrying heavier loads.

Further objects of my invention will become apparent in the following detailed description thereof.

In the accompanying drawings,

Fig. 1 is a side elevation of an object to be driven from a distance, with a part thereof sectioned to show the driving mechanism embodying my invention.

Fig. 2 is an enlarged vertical section through a portion of the driving mechanism shown in Fig. 1.

Fig. 3 is an assembly view, largely diagrammatic, showing the principle of operation of my invention.

Referring to the drawings, it will be seen that I have shown my invention as applied to moving a searchlight S in both azimuth and in elevation, the azimuth control device being shown at A and the elevation control device at B, said devices being substantially duplicates. It will be understood, however, throughout the description of this invention that the searchlight is shown only for the purpose of illustration and that my invention can be applied to the movement of any object, such as for example, guns in both azimuth and elevation. The object to be moved is usually provided with an annular rack 10 with which meshes a pinion 11, said pinion forming one end of a series of reduction gears which may include worm-wheel 12 and worm 13 from the armature 15 of a motor indicated generally by the letter M. The said reduction gearing indicates that the motor is run at a much higher speed than the object to be moved so that a very large torque may be exerted upon said object and so that the said object may be moved through very small angular distances, that is to say, so that a very fine control of the movement of said object may be obtained. In this case I have shown a motor comprising the armature 15 and brushes 16, the said brushes being caused to move as a unit around the commutator 17 of said armature by mounting said brushes in a rotatable frame 18. It will be understood from the theory of such motors that when the brushes 16 are in line with the fields 20 of said motor no torque is exerted by the fields on the armature, and hence the motor is at rest, but that when the brushes 16 are turned out of line with the motor fields a torque will be exerted by said fields on the armature. It will be at once evident that the direction of rotation of the brushes with respect to the line of the motor fields determines the direction in which the torque is applied, and hence the direction of operation of the motor. Reversal is thus secured without complicating the motor structure by special reversing mechanism. The rate of increase of torque for angular displacement of the brushes is controlled by the design of the motor, viz, multiple brushes, distributed field winding, etc.

For controlling the movements of the object from a distance, therefore, it is apparent that I need but control the rotation of the brushes 16 with respect to the fields 20. For accomplishing this I may employ any suitable form of distant controller or transmitter T which may be of the form disclosed in the application of Chester B. Mills and Preston R. Bassett, Serial No. 718,625, filed June 7, 1924, wherein the casing 25 may be rotated bodily about a vertical axis and said movement caused to operate transmitters leading to a synchronous motor M' which may be of any suitable type, either A. C. or D. C. In addition to rotating the casing 25, I may provide handles H—H' for operating fine transmitters to control the synchronous motors M—M' in azimuth and in elevation, respectively. It will be understood, however, that any type of controller may be substituted for transmitter T including those types wherein a handle is operated over a potentiometer to impress a certain voltage upon a continuously running motor and that two such controllers and two such motors may be employed for controlling the movements of brushes 16 both in the azimuth control set A and in the elevation control set B. In any case, whichever type of controller is employed there is always provided a large multiplication of movement between the controller or transmitter T and the synchronous motor M' so that small movements of the controller result in large movements of the synchronous motor and in this way a very fine control of the movement of the object may be obtained. In the form which I have shown, I may cause the casing 25 to move, for example as in the said application No. 718,625, once for each revolution of the object to be moved, whereby the object to be moved simulates the movements of the controller. Assuming for example that the casing 25 moves through one revolution for each revolution of the searchlight, the tangent controller H would be geared to move through, for example, 50 revolutions for one revolution of the searchlight in azimuth, and if the syncronous motor M' is a six-pole step-by-step motor then the motor M' would rotate through 200 revolutions for each revolution of the searchlight. In this way it will be apparent that a very fine control of the movements of the object in azimuth is obtained. While the invention is described in detail herein, with respect to the movement of the object in azimuth, it will be understood that all of these features and devices are duplicated for controlling the object in elevation.

The synchronous motor M' is caused to rotate frame 18 carrying brushes 16 to displace said brushes with respect to the fields of motor M and thus cause said motor to generate a torque which will move the object. Since it is the principal object of my invention, however, to provide for the automatic regulation of the torque output of the motor in accordance with the load upon said motor, I cause the synchronous motor M' to operate said frame 18 and brushes 16 through a differential D, said motor entering at the righthand gear (in the drawings) and rotating the planetary member which carries the frame 18, there being a follow-back from the armature 15 of motor M to the gear at the left of the differential D. Thus when the motor M is not operating and motor M' is operating, the planetary member of the differential is carried around and brushes 16 are displaced to a degree corresponding to the degree of operation of the controller T and to the lag of the armature 15, that is to say, to the load upon said armature. As soon, however, as the armature commences to rotate and drive the object, it will operate through the follow-up just described to drive the planetary member of the differential back to its original position, that is, in a direction to cause brushes 16 to align themselves with the motor field. As the motor M overcomes the static inertia of the object to be moved, the load upon the armature 15 decreases and the motor will run at an increasing speed. But this increase of speed causes the brushes 16 to be driven backward toward alignment with the motor fields, that is to say, causes a diminution of the torque generated by the motor corresponding to the lessened torque requirements due to the fact that the object has been speeded up. It will thus be seen that I have provided a means whereby automatic regulation of the torque output and net speed of the servo-motor in accordance with the requirements is obtained.

It has been described hereinbefore that it is desirable to rotate motor M at very high speed, such as for example, 3,000 to 4,000 R. P. M. in order that the necessary torque for moving the object may be obtained through reduction gearing and in order that a relatively small motor may be employed. Such speed of the armature 15 of motor M, however, will be far in excess of the speed of the armature of synchronous motor M' and hence I have shown the follow-up drive from armature 15 to the left hand gear of the differential to include reduction gearing, such as 30—31—32—33 in the proper ratio. A small-proportion reduction gearing 36—37 may be employed also between the synchornous motor M' and the right hand gear of the differential D in order to increase the torque of the relatively small motor M'.

Through the electrical and gear connections described, a definite relationship both as to speed and position between the controller and the object to be moved is established. Any movement of the controller through a given angular distance at a given angular velocity will cause a corresponding movement of the object through the same angular distance at the same angular velocity, if the predetermined ratio of movement between the controller and object is 1:1; if the predetermined ration is other than 1:1 said ratio will be maintained as to distance and velocity. In other words, perfect synchronism, at all speeds from zero up to the maximum speed of motor M, is obtained between the controller and the object to be moved.

It will be observed that the connections between synchronous motor M' and motor M are such that the armature of motor M assists the rotation of motor M'. For this purpose shaft S' driven by the armature of motor M has frictional bearing engagement with the differential gear G connected to motor M' through means such as gearing 36, 37. The high speed of motor M will thus assist in driving motor M', making possible a greater speed of motor M' and permitting said motor to operate greater loads.

Upon stopping the movement of controller T, motor M continues to operate to return the brushes to a position in alignment with the fields. The momentum of the object or the armature may tend to carry the brushes beyond this position, thus reversing the motor M and effecting quick stopping. The motor M thus acts as a dynamic brake since it operates to stop the movement of its own armature.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. In a distant control mechanism for moving an object from a distance, a transmitter, a motor for actuating said object having an armature, a commutator, field coils, and rotatable brushes engaging said commutator, the relative displacement between said brushes and said field coils determining the magnitude and direction of the torque generated by said motor, and means whereby the relative positions of said brushes and said field coils are controlled by the differential of the transmitter and the object positions and speeds.

2. In a distant control mechanism for moving an object from a distance, a transmitter, a motor for actuating said object having an armature, a commutator, field coils, and rotatable brushes engaging said commutator, the relative displacement between said brushes and said field coils determining the torque generated by said motor, the speed of said armature being a function of the generated torque and the load to be moved, and means whereby the relative positions of said brushes and said field coils are controlled by the differential of the transmitter and armature speeds.

3. In a distant control system for moving an object from a distance, a transmitter, a light-duty low-current synchronous motor controlled by said transmitter, a heavy-duty large-current servo motor controlled by said first motor for actuating said object, and means whereby the operation of said servo motor assists the operation of said first motor.

4. In a distant control system for moving an object from a distance, a transmitter, a light-duty low-current synchronous motor controlled by said transmitter, a heavy-duty large-current servo motor controlled by said first motor for actuating said object, and means including a frictional connection whereby the operation of said servo motor assists the operation of said first motor.

5. In a distant control mechanism for moving an object from a distance, a transmitter, a motor for actuating said object having an armature, a commutator, field coils, and rotatable brushes engaging said commutator, the relative displacement between said brushes and said field coils determining the torque generated by said motor and the direction of said displacement determining the direction of said torque, and means whereby the relative positions of said brushes and said field coils are controlled by the differential of the transmitter and the object positions.

6. In a distant control mechanism for moving an object from a distance, a transmitter, a motor for actuating said object having an armature, a commutator, field coils, and rotatable brushes engaging said commutator, the relative dipslacement between said brushes and said field coils determining the torque generated by said motor, means whereby the relative positions of said brushes and said field coils are controlled by the differential of the transmitter and the object speeds, and means whereby overrunning of said brushes brakes said armature.

In testimony whereof I have affixed my signature.

FRANK R. HOUSE.